US008360210B2

(12) United States Patent
Kigawa

(10) Patent No.: US 8,360,210 B2
(45) Date of Patent: Jan. 29, 2013

(54) OIL BUFFER FOR AN ELEVATOR

(75) Inventor: Hiroshi Kigawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 557 days.

(21) Appl. No.: 12/599,700

(22) PCT Filed: Aug. 31, 2007

(86) PCT No.: PCT/JP2007/067047
§ 371 (c)(1),
(2), (4) Date: Nov. 11, 2009

(87) PCT Pub. No.: WO2009/028100
PCT Pub. Date: Mar. 5, 2009

(65) Prior Publication Data

US 2010/0307871 A1 Dec. 9, 2010

(51) Int. Cl.
*B66B 5/28* (2006.01)
*B60G 11/56* (2006.01)
*F16F 9/48* (2006.01)

(52) U.S. Cl. ......................... 187/344; 267/118; 188/289

(58) Field of Classification Search .................. 187/344; 267/34, 118, 119, 130; 188/283, 284, 288, 188/289, 129, 285, 287; *B66B 5/28*
See application file for complete search history.

(56) References Cited

U.S. PATENT DOCUMENTS

| | | | | | |
|---|---|---|---|---|---|
| 3,456,764 | A | * | 7/1969 | Myers | 188/289 |
| 3,554,387 | A | * | 1/1971 | Thornhill et al. | 213/223 |
| 3,857,555 | A | * | 12/1974 | Mori et al. | 267/34 |
| 3,885,776 | A | * | 5/1975 | Blatt | 267/34 |
| 4,284,177 | A | * | 8/1981 | Domek | 188/280 |
| 4,437,548 | A | * | 3/1984 | Ashiba | 188/289 |
| 4,482,035 | A | * | 11/1984 | Heideman et al. | 188/287 |
| 5,160,123 | A | * | 11/1992 | Danieli | 267/226 |

FOREIGN PATENT DOCUMENTS

| | | | | |
|---|---|---|---|---|
| EP | 1792866 | A1 | * | 6/2007 |
| JP | 56 71543 | | | 6/1981 |
| JP | 57 175832 | | | 11/1982 |
| JP | 4 201965 | | | 7/1992 |
| JP | 4 217577 | | | 8/1992 |
| JP | 5 187471 | | | 7/1993 |
| JP | 7 325007 | | | 12/1995 |
| JP | 2003 146554 | | | 5/2003 |
| JP | 2004324879 | A | * | 11/2004 |

* cited by examiner

*Primary Examiner* — Michael Mansen
*Assistant Examiner* — Stefan Kruer
(74) *Attorney, Agent, or Firm* — Oblon, Spivak, McClelland, Maier & Neustadt, L.L.P.

(57) ABSTRACT

In an oil buffer for an elevator, at least one cylindrical intermediate plunger is inserted into a base cylinder. An upper-stage plunger is inserted into the intermediate plunger. An orifice is provided in a bottom surface portion of the upper-stage plunger. A pin rod is provided upright in the base cylinder. The pin rod is inserted into the orifice in a middle of a stroke of the upper-stage plunger. A return spring causes the intermediate plunger and the upper-stage plunger to return to positions in an unloaded state.

6 Claims, 13 Drawing Sheets

OIL BUFFER FOR AN ELEVATOR

TECHNICAL FIELD

The present invention relates to an oil buffer for an elevator, in particular, to a multi-stage oil buffer including a base cylinder, at least one intermediate plunger, and an upper-stage plunger.

BACKGROUND ART

In a conventional multi-stage oil buffer, a first cylinder is inserted into a base cylinder. A second cylinder having a smaller diameter than that of the first cylinder is inserted into the first cylinder. A third cylinder having a smaller diameter than that of the second cylinder is inserted into the second cylinder. A return spring is provided between the base cylinder and the first cylinder. A hydraulic oil is enclosed in the first and second cylinders (for example, see Patent Document 1). Patent Document 1: JP 04-217577 A

DISCLOSURE OF THE INVENTION

Problem to be Solved by the Invention

In the conventional oil buffer as described above, not only a restoring force of the return spring but also the movement of the hydraulic oil are required for returning from a compressed state. Therefore, the conventional oil buffer is likely to be affected by a temperature and the like. In some case, there is a possibility that the oil buffer cannot fully return. Moreover, for the return, the perfect sealing of a sliding portion between a plunger head and an inner circumferential surface of a plunger is required. Therefore, a highly accurate cutting process for the inner circumferential surface of the plunger is required, thereby increasing cost.

The present invention is made to solve the problem described above, and has an object of providing an oil buffer for an elevator, capable of stably returning from a compressed state with a simple structure, for which deceleration design is easy.

An oil buffer for an elevator according to the present invention includes: a base cylinder filled with a hydraulic oil; at least one cylindrical intermediate plunger axially slidably inserted into the base cylinder; an upper-stage plunger, which is axially slidably inserted into the intermediate plunger, and has an orifice provided in a bottom surface portion; a pin rod, which is provided upright in the base cylinder, and inserted into the orifice in a middle of a stroke of the upper-stage plunger; and a return spring for causing the intermediate plunger and the upper-stage plunger to return to positions in an unloaded state.

BEST MODE FOR CARRYING OUT THE INVENTION

Figure 1:
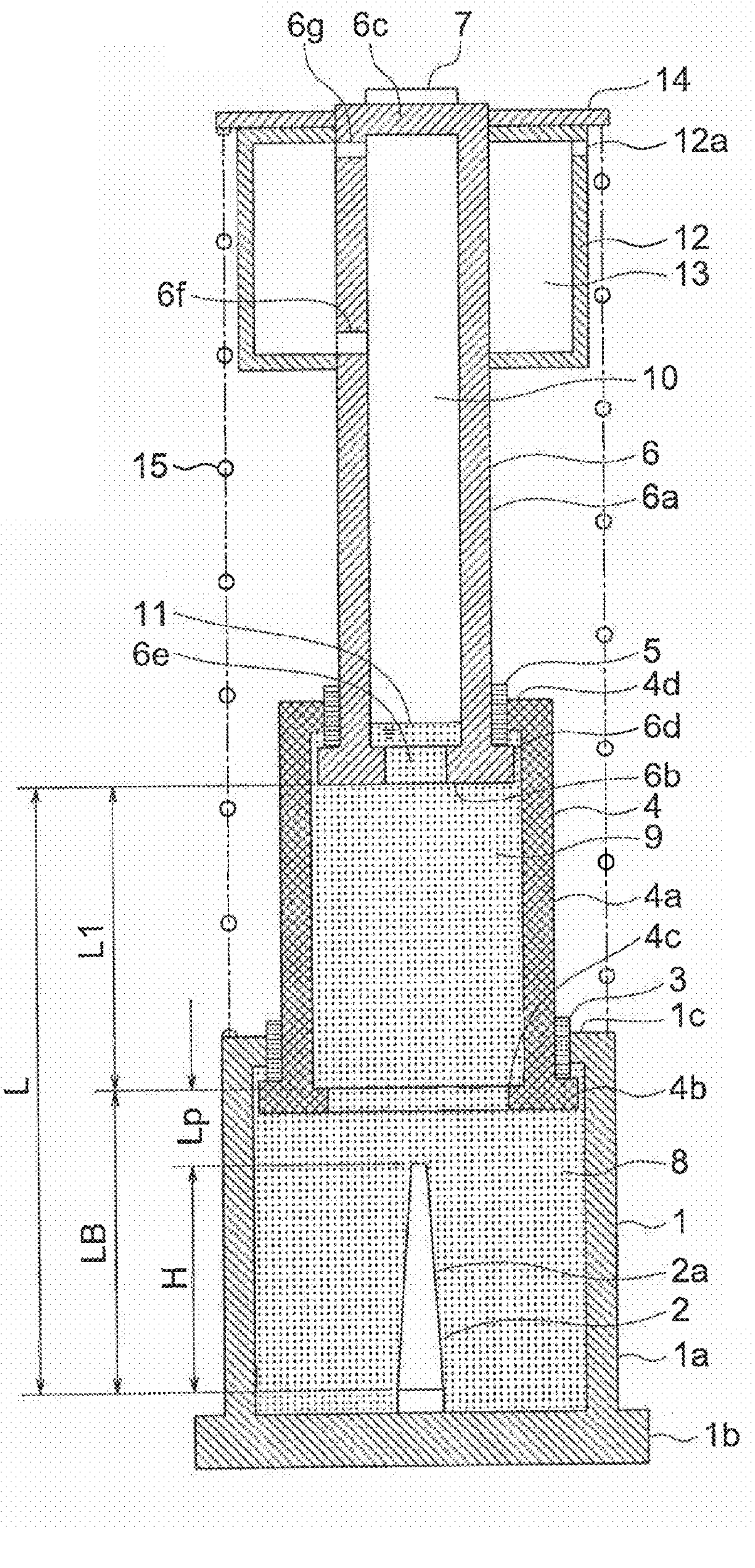
FIG. 1 is a sectional view illustrating an unloaded state of an oil buffer for an elevator according to a first embodiment of the present invention.

Hereinafter, preferred embodiments of the present invention are described referring to the drawings.

First Embodiment

Figure 2:
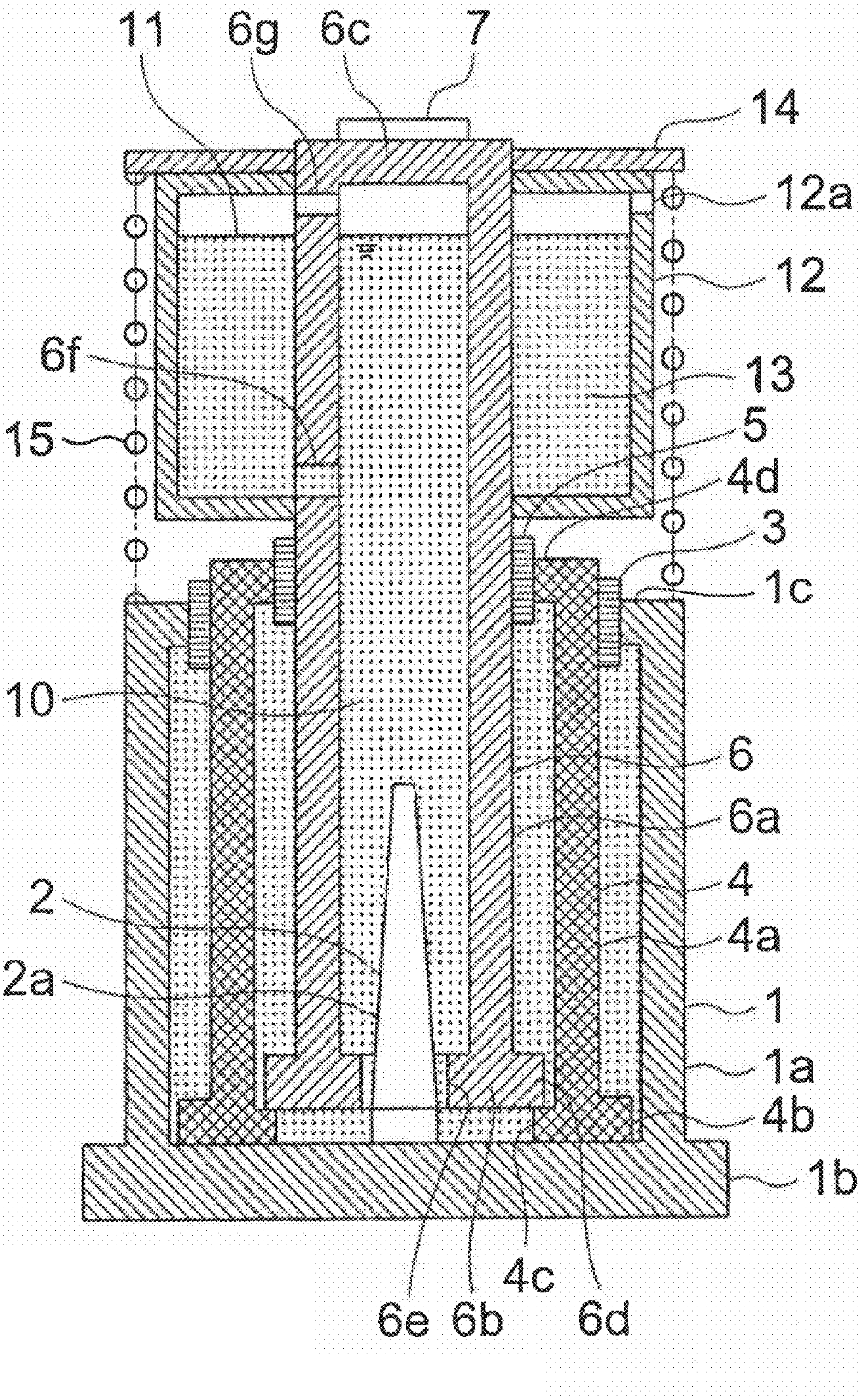
FIG. 2 is a sectional view illustrating a state where the oil buffer illustrated in FIG. 1 is compressed through a full stroke.

FIG. 1 is a sectional view illustrating an unloaded state of an oil buffer for an elevator according to a first embodiment of the present invention, and FIG. 2 is a sectional view illustrating a state where the oil buffer illustrated in FIG. 1 is compressed through a full stroke.

In the drawings, on a bottom (in a pit) of a hoistway in which ascending/descending bodies such as a car and a counterweight are raised and lowered, a base cylinder 1 is provided vertically upright. The base cylinder 1 is fixed onto the bottom of the hoistway by an anchor bolt or the like. Moreover, the base cylinder 1 includes a cylindrical base cylinder main body 1*a*, a base cylinder bottom surface portion 1*b* which closes an opening at a lower end of the base cylinder main body 1*a*, and a base cylinder engaging portion 1*c* which projects from an upper end portion of the base cylinder main body 1*a* to a radially-inner side.

On the base cylinder bottom surface portion 1*b*, a pin rod 2 is provided vertically upright. The pin rod 2 has a tapered portion 2*a* having a cross section gradually increasing downward (toward the base cylinder bottom surface portion 1*b*)

from its upper end surface. A cylindrical first slide bush 3 is arranged on an inner circumference of the base cylinder engaging portion 1*c*.

An intermediate plunger 4 is inserted into an upper end portion of the base cylinder 1. The intermediate plunger 4 includes a cylindrical intermediate plunger main body 4*a*, an intermediate plunger retaining portion 4*b* projecting from an lower end portion of the intermediate plunger main body 4*a* to a radially-outer side, a stopper portion 4*c* projecting from the lower end portion of the intermediate plunger main body 4*a* to the radially-inner side, and an intermediate plunger engaging portion 4*d* projecting from an upper end portion of the intermediate plunger main body 4*a* to the radially-inner side.

The intermediate plunger main body 4*a* is vertically slidable along an inner circumferential surface of the first slide bush 3. Therefore, an outer circumferential surface of the intermediate plunger main body 4*a*, that is, a sliding surface with respect to the first slide bush 3 is smoothly machined. On the other hand, a clearance is provided between an outer circumferential surface of the retaining portion 4*b* and the inner circumferential surface of the base cylinder 1, and hence it is not necessary to perform special machining for the outer circumferential surface of the intermediate plunger retaining portion 4*b* and the inner circumferential surface of the base cylinder 1.

On an inner circumference of the intermediate plunger engaging portion 4*d*, a cylindrical second slide bush 5 is provided.

An upper-stage plunger 6 is inserted into an upper end portion of the intermediate plunger 4. The upper-stage plunger 6 includes a cylindrical upper-stage plunger main body 6*a*, an upper-stage plunger bottom surface portion 6*b* provided to a lower end portion of the upper-stage plunger main body 6*a*, and an upper-stage plunger upper surface portion 6*c* which closes an opening at an upper end of the upper-stage plunger main body 6*a*.

The upper-stage plunger main body 6*a* is vertically slidable along an inner circumferential surface of the second slide bush 5. Therefore, an outer circumferential surface of the upper-stage plunger main body 6*a*, that is, a sliding surface with respect to the second slide bush 5 is smoothly machined.

An upper-stage plunger retaining portion 6*d* projecting from the outer circumferential surface of the upper-stage plunger main body 6*a* to the radially-outer side is provided to an outer circumferential portion of the upper-stage plunger bottom surface portion 6*b*. A clearance is provided between an outer circumferential surface of the upper-stage plunger retaining portion 6*d* and an inner circumferential surface of the intermediate plunger 4, and hence it is not necessary to perform special machining for the outer circumferential surface of the upper-stage plunger retaining portion 6*d* and the inner circumferential surface of the intermediate plunger 4. Moreover, when the oil buffer is compressed to lower the upper-stage plunger 6, a lower surface of the upper-stage plunger retaining portion 6*d* comes to abut against the stopper portion 4*c* in the middle of a stroke.

In the center of the upper-stage plunger bottom surface portion 6*b*, an orifice (opening portion) 6*e* is provided. When the oil buffer is compressed to lower the upper-stage plunger 6, the pin rod 2 is inserted into the orifice 6*e* in the middle of the stroke. An elastic member 7 is firmly fixed onto an upper surface of the plunger upper surface portion 6*c*.

In an unloaded state as illustrated in FIG. 1, a base cylinder chamber 8 is formed in the base cylinder 1. An intermediate plunger chamber 9 is formed in the intermediate plunger 4. An upper-stage plunger chamber 10 is formed in the upper-stage plunger 6. Moreover, in the unloaded state, a hydraulic oil 11 fills the base cylinder chamber 8 and the intermediate plunger chamber 9. Further, an oil level of the hydraulic oil 11 in the unloaded state is situated above the orifice 6*e*.

An oil chamber case 12 is fixed onto the outer circumferential portion of the upper-stage plunger 6 to surround the upper-stage plunger 6. The oil chamber case 12 forms an oil chamber 13 for containing the hydraulic oil 11 therein when the oil buffer is compressed. The oil chamber case 12 is located in the vicinity of an upper end portion of the upper-stage plunger 6 to prevent the upper-stage plunger 6 from abutting against the intermediate plunger 4 even when the upper-stage plunger 6 is compressed through a full stroke. More specifically, a portion of the upper-stage plunger 6, to which the oil chamber case 12 is mounted, upwardly projects from the intermediate plunger 4 even when the oil buffer is compressed through the full stroke.

A communication hole 6*f* for bringing the upper-stage plunger chamber 10 and a lowermost portion of the oil chamber 13 into communication with each other is provided to the upper-stage plunger 6. An oil chamber case vent hole 12*a* for bringing an uppermost portion of the oil chamber 13 and the exterior of the oil chamber case 12 into communication with each other is provided to the oil chamber case 12. An upper-stage plunger vent hole 6*g* for bringing the upper-stage plunger chamber 10 and the uppermost portion of the oil chamber 13 into communication with each other is provided to the upper-stage plunger 6. The oil chamber case vent hole 12*a* and the upper-stage plunger vent hole 6*g* are provided at a height that the oil level does not reach even when the oil buffer is compressed through the full stroke. By the vent holes 12*a* and 6*g*, a pressure of each of the oil chamber 13 and the upper-stage plunger chamber 10 is constantly maintained at an atmospheric pressure.

The oil chamber case 12 is located below the upper surface of the upper-stage plunger upper surface portion 6*c*. As a result, a force at the time of collision of the ascending/descending body against the oil buffer is not exerted on the oil chamber case 12. Therefore, the oil chamber case 12 can be reduced in weight.

A spring bearing 14 is fixed to an outer circumferential portion of the upper-stage plunger upper surface portion 6*c*. A return spring 15 is provided between the upper end portion of the base cylinder 1 and the spring bearing 14. As the return spring 15, for example, a coil spring which surrounds the intermediate plunger 4, the upper-stage plunger 6, and the oil chamber case 12 is used.

When a load is removed from a full-stroke compression state, the upper-stage plunger 6 is pushed up by a restoring force of the return spring 15. Thereafter, when the upper-stage plunger retaining portion 6*d* comes to abut against the second slide bush 5, the intermediate plunger 4 is pulled up by the upper-stage plunger 6. Then, when the intermediate plunger retaining portion 4*b* comes to abut against the first slide bush 3, the upward movement of the upper-stage plunger 6 and the intermediate plunger 4 is stopped. As a result, a state illustrated in FIG. 1 is maintained.

Next, a method of designing the pin rod 2 is described.

Figure 3:
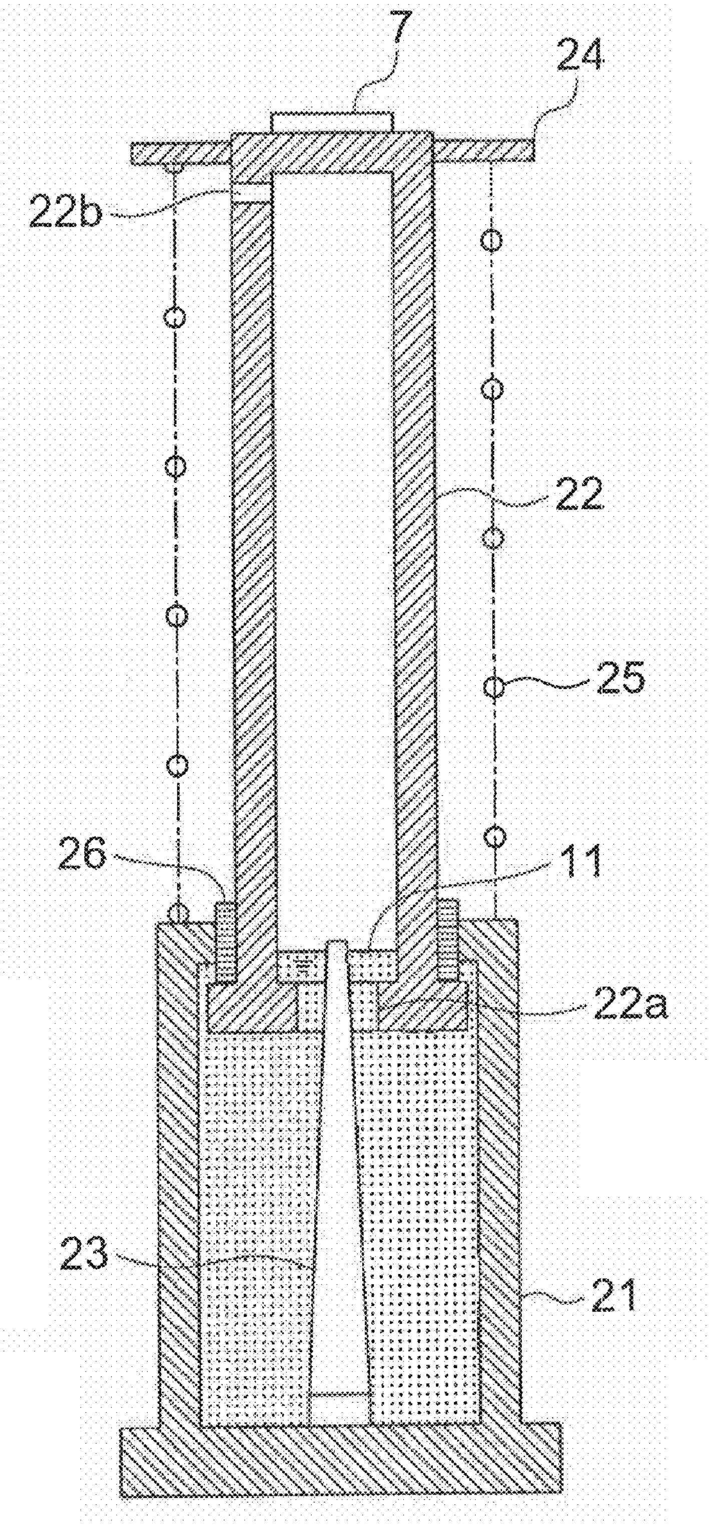
FIG. 3 is a sectional view illustrating a single-stage oil buffer as a comparative example.

FIG. 3 is a sectional view illustrating an unloaded state of a single-stage oil buffer as a comparative example. In the drawing, a plunger 22 is inserted into a base cylinder 21. A pin rod 23 having a tapered portion 23*a* is provided upright in the base cylinder 21. An orifice 22*a* is provided through a lower end portion of the plunger 22. The pin rod 23 is inserted into the orifice 22*a*.

In the vicinity of an upper end portion of the plunger 22, a vent hole 22*b* is provided. Onto an upper end surface of the plunger 22, the elastic member 7 is firmly fixed. A spring bearing 24 is fixed to the upper end portion of the plunger 22. A return spring 25 is provided between an upper end portion of the base cylinder 21 and the spring bearing 24.

A slide bush 26 is provided to be interposed between the base cylinder 21 and the plunger 22. In the unloaded state, the oil level of the hydraulic oil 11 is situated above the orifice 22*a*.

In general, in the single-stage oil buffer as illustrated in FIG. 3, the insertion of the tapered portion 23*a* into the orifice 22*a* changes an opening area of the orifice 22*a* (an area of the orifice—a sectional area of the pin rod) along with displacement of the plunger 22. As a result, a deceleration rate in the case where the ascending/descending body having a predetermined weight collides against the oil buffer at a predetermined velocity is made constant. Therefore, the pin rod 23 is designed so that a relation expressed by the following formula is established between displacement x of the plunger 22 and an opening area a of the orifice 22*a*.

[Equation 1]

$$\alpha = \sqrt{\frac{\rho A^3(L-x)}{c_d^2 M\left(1+\frac{2gL}{v_0^2}\right)}} \quad (1)$$

Figure 4:
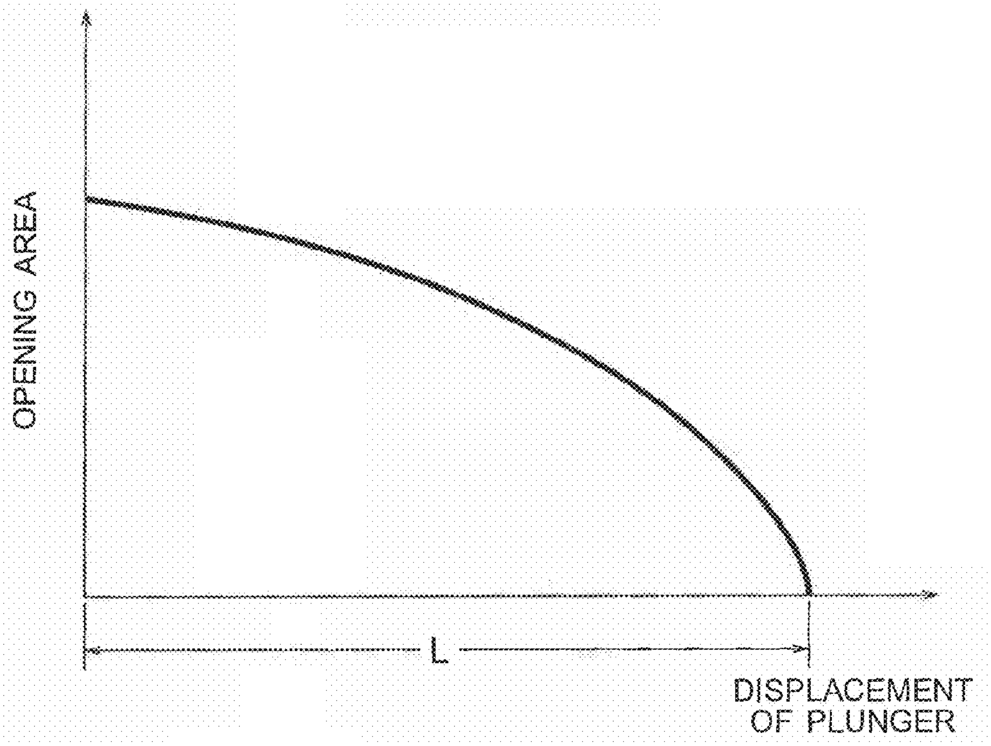
FIG. 4 is a graph showing a relation between displacement of a plunger illustrated in FIG. 3 and an opening area of an orifice.

Here, ρ is a density of the hydraulic oil, A is a pressure-receiving area, L is a full stroke, $c_d$ is a flow rate coefficient (constant), M is a weight of the ascending/descending body, g is a gravitational acceleration, and $v_0$ is a collision velocity. Moreover, when Formula (1) is graphed, FIG. 4 is obtained.

On the other hand, in the two-stage structure as in this embodiment, the pressure-receiving area increases when the upper-stage plunger 6 is lowered to be integrated with the intermediate plunger 4. When FIG. 4 is redrawn in view of such an increase in pressure-receiving area, a solid line illustrated in FIG. 5 is obtained.

Figure 5:
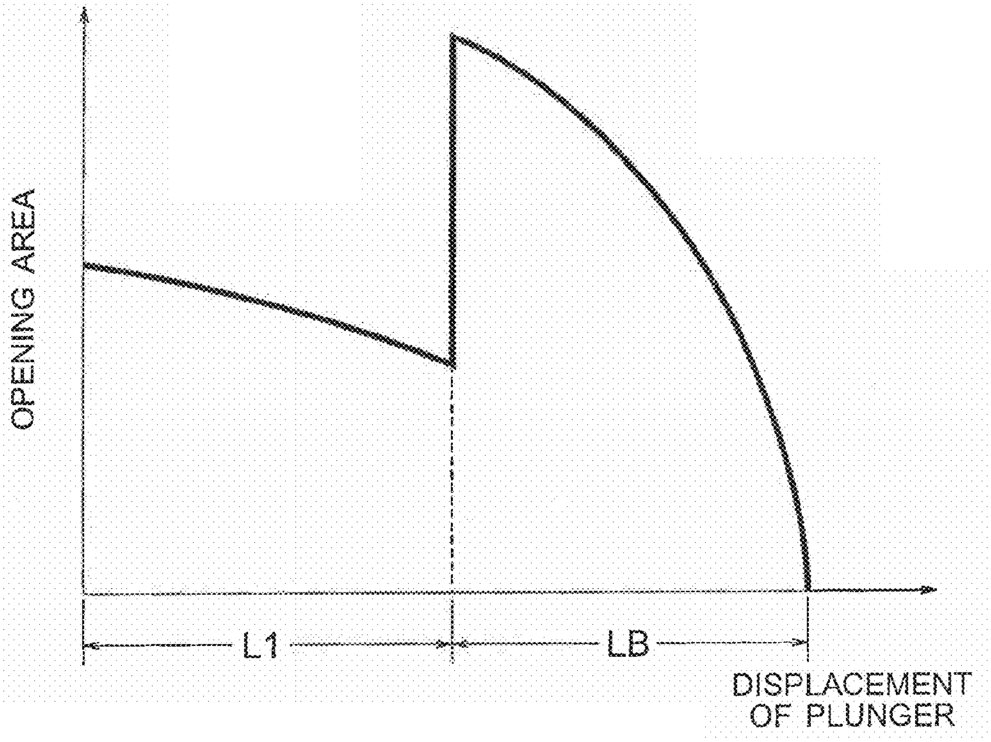
FIG. 5 is a graph obtained by redrawing the graph illustrated in FIG. 4 for a two-stage oil buffer.

In FIG. 5, L1 represents a stroke through which the upper-stage plunger 6 alone descends, whereas LB represents a stroke through which the upper-stage plunger 6 and the intermediate plunger 4 are integrated with each other to be inserted into the base cylinder 1. Therefore, if the pin rod 2 can be provided over the full stroke, an ideal oil buffer with a constant deceleration rate can be realized by designing a sectional area of the pin rod 2 so that the opening area changes with respect to the displacement of the upper-stage plunger 6 as illustrated in FIG. 5.

With the multi-stage structure, however, a height H of the pin rod 2 is limited by a height at the time of full-stroke compression. Moreover, the opening area is equal to the area of the orifice 6*e* itself and is constant until the insertion of the pin rod 2 into the orifice 6*e*. Therefore, it is impossible to make the opening area larger than the area of the orifice 6*e* itself. Thus, in order to obtain deceleration performance close to ideal, it is effective to determine the area of the orifice 6*e* itself and a shape of the pin rod 2 to obtain an opening area as close as possible to that indicated by the ideal opening area curve (solid line) illustrated in FIG. 5.

Figure 6:
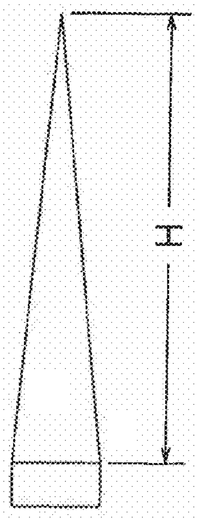
FIG. 6 is a side view illustrating a pin rod having a pointed distal end.
Figure 7:
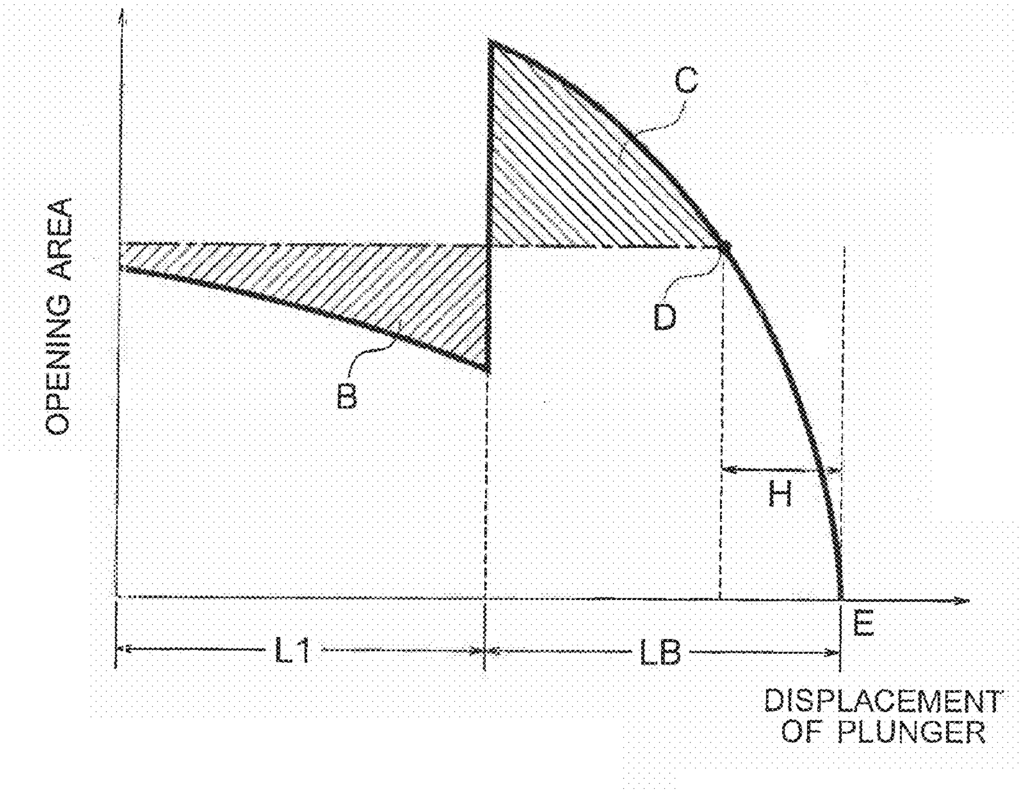
FIG. 7 is a graph showing a relation between displacement of an upper-stage plunger and the opening area of the orifice in the case where the pin rod illustrated in FIG. 6 is used for the oil buffer illustrated in FIG. 1.

FIG. 6 is a side view illustrating a pin rod having a pointed distal end, and FIG. 7 is a graph showing a relation between the displacement of the upper-stage plunger 6 and the opening area of the orifice 6*e* when the pin rod illustrated in FIG. 6 is used for the oil buffer illustrated in FIG. 1. In this case, if the area of the orifice 6*e* itself (indicated by an alternate long and short dash line in FIG. 7) is determined so that an area of an excessive portion (region B illustrated in FIG. 7) with respect to an ideal opening area (indicated by a solid line in FIG. 7) becomes equal to an area of a deficient portion (region C illustrated in FIG. 7) with respect to the ideal opening area, the substantial height H of the pin rod 2 (height of a portion inserted into the orifice 6*e*) is determined by an intersection point D of the area of the orifice 6*e* and the ideal opening area curve.

In this example, the intersection point D is situated in the middle of the stroke LB through which the upper-stage plunger 6 reaches the base cylinder 1. Therefore, the distal end of the pin rod 2 is required to be present in the middle of the stroke LB, that is, below the position of the orifice 6*e* when the intermediate plunger 4 starts descending. The shape of the tapered portion 2*a* is determined so that the opening area of the orifice 6*e* is identical as much as possible with an opening area indicated by an ideal opening area curve D-E.

Figure 8:
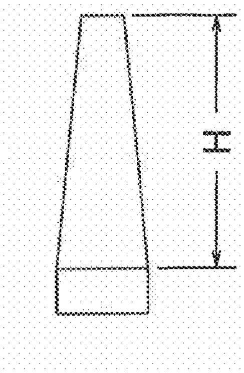
FIG. 8 is a side view illustrating a pin rod having a flat distal end.
Figure 9:
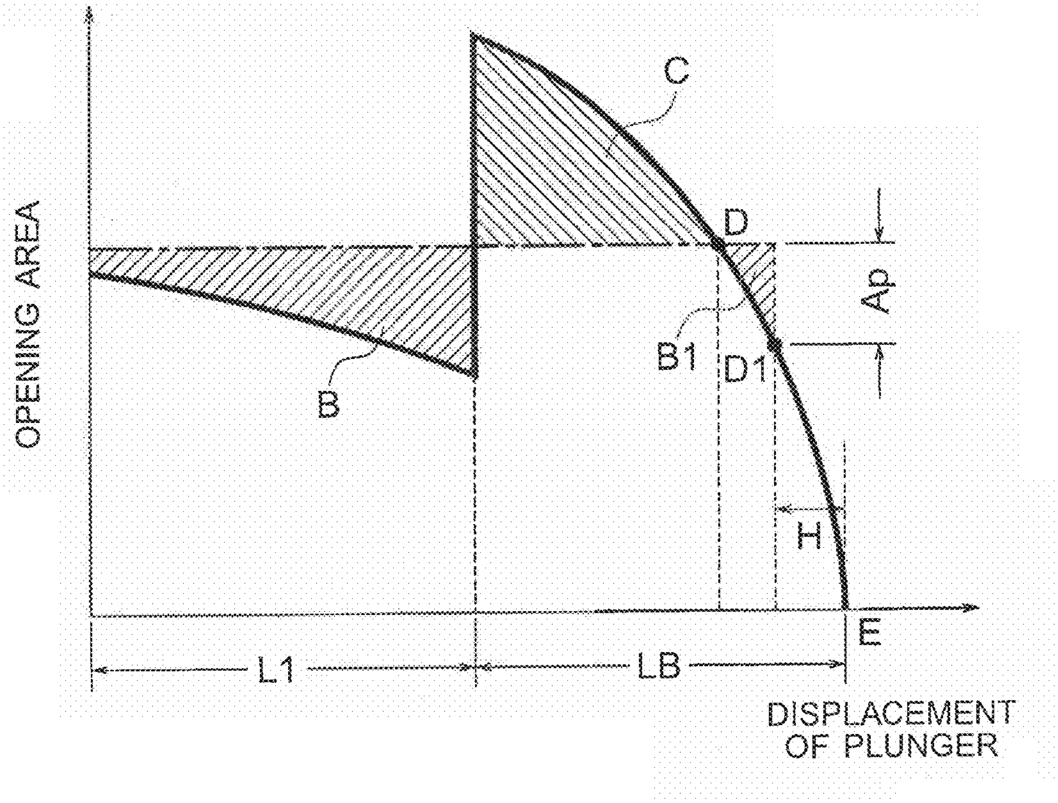
FIG. 9 is a graph showing the relation between the displacement of the upper-stage plunger and the opening area of the orifice in the case where the pin rod illustrated in FIG. 8 is used for the oil buffer illustrated in FIG. 1.

Next, FIG. 8 is a side view illustrating the pin rod having a flat distal end, and FIG. 9 is a graph showing the relation between the displacement of the upper-stage plunger 6 and the opening area of the orifice 6*e* when the pin rod illustrated in FIG. 8 is used for the oil buffer illustrated in FIG. 1.

Although the shape of the pin rod 2 is ideally tapered with a pointed distal end as illustrated in FIG. 6, the distal end is sometimes forced to be flat in view of processing. Even in this case, if an area Ap of an upper surface of the pin rod 2 is sufficiently small with respect to the area of the orifice 6*e* itself, the designing method illustrated in FIG. 7 can be employed. When the area Ap is large, however, a designing method in consideration of the area Ap should be selected.

When the area Ap is taken into consideration, the area of the orifice 6*e* itself (indicated by an alternate long and short dash line in FIG. 9) is determined so that the sum of the area of the region B and an area of a region B1 illustrated in FIG. 9 (excessive portion with respect to the ideal opening area after the point D) becomes equal to the area of the region C. Then, from an intersection point D1, the height H of the pin rod 2 is determined. Further, the shape of the tapered portion 2*a* is determined so that the opening area of the orifice 6*e* becomes identical as much as possible with an opening area indicated by an ideal opening area curve D1-E.

Figure 10:
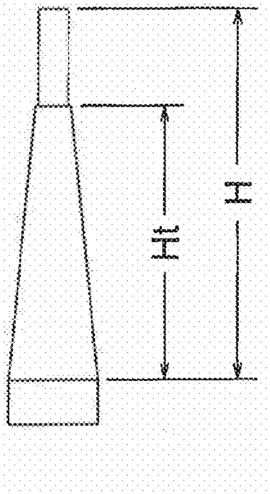
FIG. 10 is a side view illustrating a pin rod having a columnar portion at the distal end.
Figure 11:
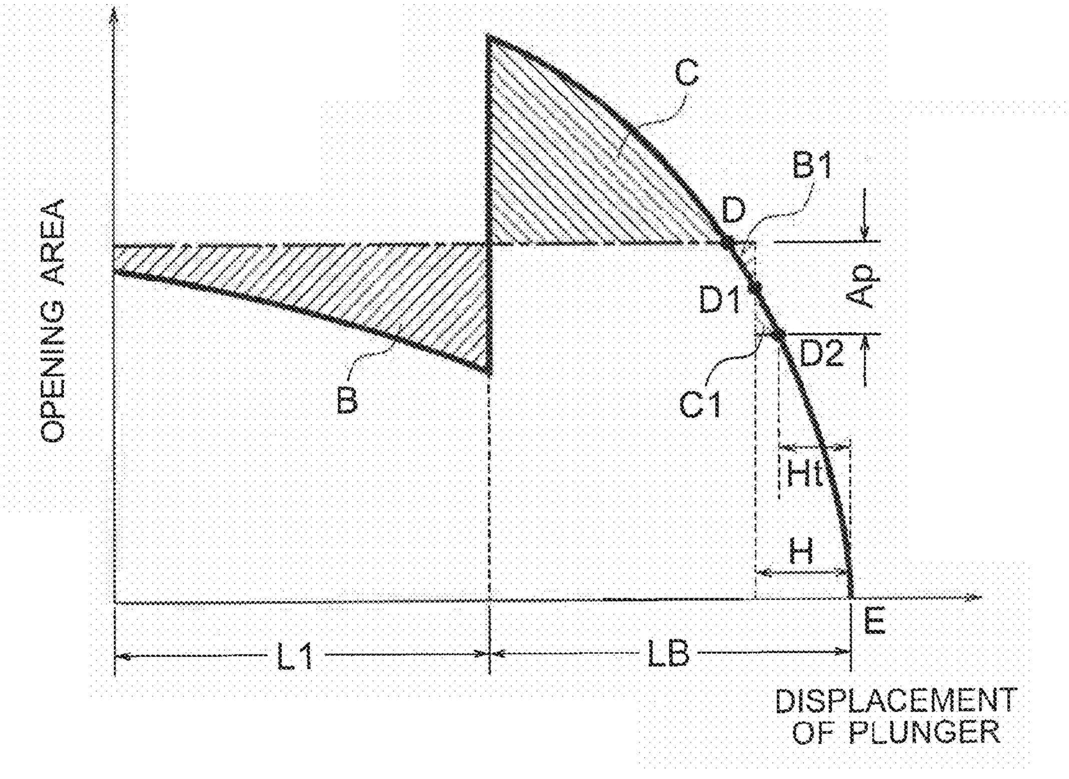
FIG. 11 is a graph showing the relation between the displacement of the upper-stage plunger and the opening area of the orifice in the case where the pin rod illustrated in FIG. 10 is used for the oil buffer illustrated in FIG. 1.

FIG. 10 is a side view illustrating the pin rod having a columnar portion at the distal end, and FIG. 11 is a graph showing the relation between the displacement of the upper-stage plunger 6 and the opening area of the orifice 6*e* when the pin rod illustrated in FIG. 10 is used for the oil buffer illustrated in FIG. 1.

The height H of the pin rod 2 becomes small as compared with the case illustrated in FIG. 7 according to the designing method as illustrated in FIG. 9, and hence a decelerating force in the vicinity of a terminal end of the stroke is insufficient. As a result, the upper-stage plunger 6 collides against the base cylinder bottom face portion 1*b* without sufficient deceleration, thereby temporarily generating a large deceleration rate in some cases. On the other hand, the shape as illustrated in FIG. 10 can ensure a sufficient decelerating force in the vicinity of the terminal end of the stroke.

In this case, the area of the orifice 6*e* itself (indicated by an alternate long and short dash line shown in FIG. 11) is determined so that the area of the region B becomes equal to the area of the region C illustrated in FIG. 11. Moreover, the height H of the pin rod 2 (indicated by the point D1) and a height Ht of the tapered portion 2*a* (indicated by a point D2) are determined so that the area of the region B1 becomes equal to an area of a region Cl (deficient portion with respect to the ideal opening area after the point D). Further, the shape of the tapered portion 2*a* is determined so that the opening area of the orifice 6*e* becomes identical as much as possible with an opening area indicated by an ideal opening area curve D2-E.

Figure 12:
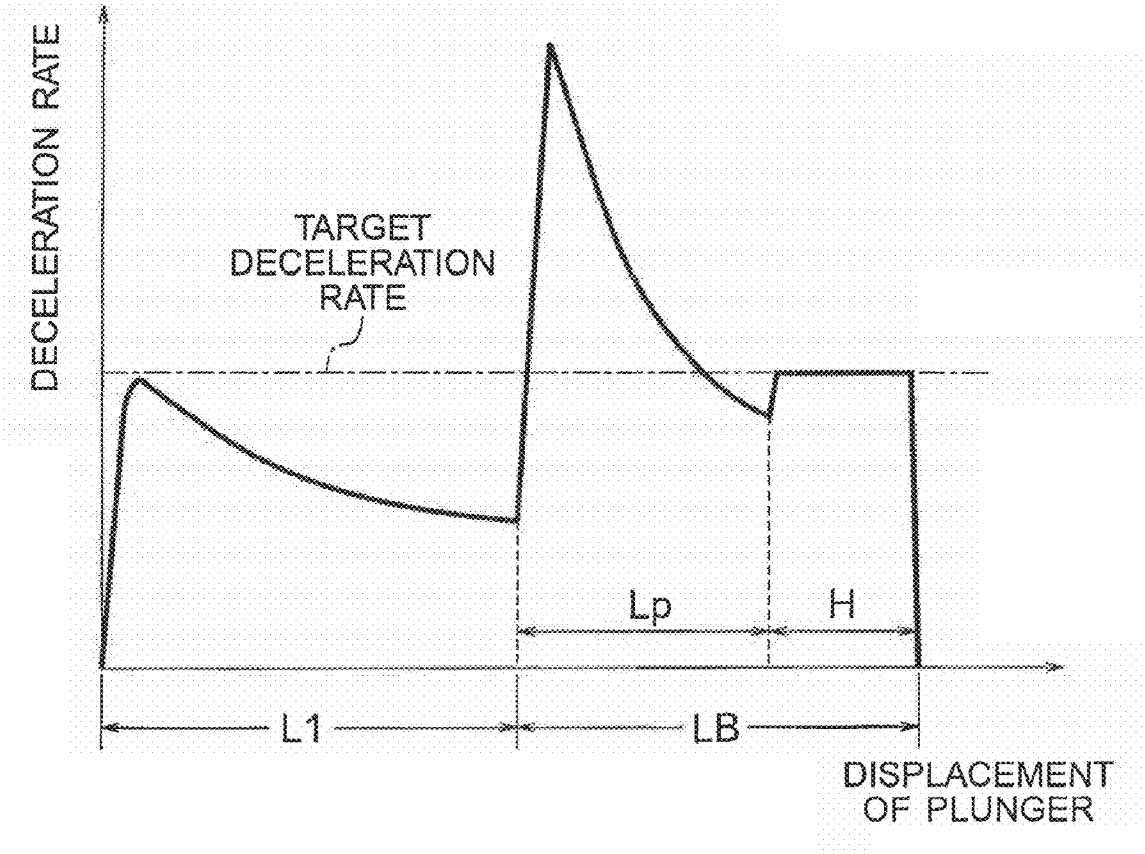
FIG. 12 is a graph showing the displacement of the upper-stage plunger and a deceleration rate in the oil buffer illustrated in FIG. 1.

Next, an operation of the oil buffer designed as described above is described. FIG. 12 is a graph showing the displacement of the upper-stage plunger 6 and the deceleration rate in the oil buffer illustrated in FIG. 1. When the ascending/descending body having the predetermined weight collides against the oil buffer in the unloaded state illustrated in FIG. 1 at a certain fall velocity (design velocity), the elastic member 7 is first subjected to impact. Thereafter, the upper-stage plunger 6 starts descending.

At the same time, a pressure of the hydraulic oil 11 in the base cylinder chamber 8 and the intermediate plunger chamber 9 increases. As a result, the hydraulic oil 11 in the intermediate plunger chamber 9 is blown into the upper-stage plunger chamber 10 through the orifice 6*e*. At this time, the bottom surface of the upper-stage plunger 6 is subjected to the pressure of the hydraulic oil 11. As a result, the decelerating force is transmitted from the upper-stage plunger 6 through the elastic member 7 to the ascending/descending body.

Moreover, although the intermediate plunger 4 tends to descend by its own weight along with the upper-stage plunger 6, the intermediate plunger 4 is subjected to a force from below due to the increase in pressure of the hydraulic oil 11 to maintain its position. Therefore, in this stage, the upper-stage plunger 6 alone descends while decelerating the ascending/descending body. The opening area of the orifice 6*e* at this time does not change to remain equal to the area of the orifice 6*e* itself, and hence the decelerating force decreases substantially in proportion to a square of the velocity of the ascending/descending body. Then, the deceleration rate until the upper-stage plunger 6 descends by the stroke L1 shifts at a level lower than a design deceleration rate.

Thereafter, when the upper-stage plunger 6 descends by the stroke L1 and the intermediate plunger 4 starts descending integrally with the upper-stage plunger 6, the hydraulic oil 11 in the base cylinder chamber 8 is blown into the upper-stage plunger chamber 10 through the orifice 6*e* because a volume of the intermediate plunger chamber 9 has become approximately zero. At this time, the pressure of the hydraulic oil 11 in the base cylinder chamber 8 increases and the pressure-receiving area is increased as a result of the descent of the intermediate plunger 4, and hence the decelerating force also increases.

On the other hand, the bottom surface of the intermediate plunger 4 is open over almost the entire surface and there is no effect of superposition of the orifice 6*e* and a fluid resistance, and hence the decelerating force is controlled by the opening area of the orifice 6*e*. As a result, an increase in deceleration rate can be kept small. Moreover, the opening area of the orifice 6*e* does not change to remain equal to the area of the orifice 6*e* itself until the upper-stage plunger 6 descends by a stroke Lp, and hence the decelerating force decreases substantially in proportion to the square of the velocity of the ascending/descending body. Then, the deceleration rate shifts at a level higher than the design deceleration rate.

Thereafter, when the upper-stage plunger 6 descends by the stroke Lp, the pin rod 2 starts to be inserted into the orifice 6*e*. At this time, if the pin rod 2 has the flat distal end as illustrated in FIGS. 1 and 8, a resistance when the hydraulic oil 11 passes through the orifice 6*e* increases because the opening area of the orifice 6*e* decreases by an area of a distal end surface. As a result, the pressure of the hydraulic oil in the base cylinder chamber 8 increases, and hence the decelerating force also increases.

After the stroke Lp, a constant deceleration rate is maintained regardless of the stroke as long as design conditions are satisfied. Therefore, the decelerating force is maintained after the stroke Lp until the ascending/descending body stops. Therefore, the ascending/descending body can be stopped without being subjected to great impact. The deceleration rate during this time shifts at a level substantially equal to the design deceleration rate.

In the oil buffer as described above, the intermediate plunger 4 and the upper-stage plunger 6 are caused to return to their positions in the unloaded state only by the restoring force of the return spring 15. Therefore, the return from the compressed state can be stably performed. Moreover, it is not necessary to finish the inner circumferential surface of the base cylinder 1 or the inner circumferential surface of the intermediate plunger 4 with high accuracy, and hence the structure can be simplified to reduce cost.

Further, the cylindrical intermediate plunger 4 is used and the orifice 6*e* is provided only to the upper-stage plunger, and hence the deceleration performance is determined by the design of the orifice 6*e* and the pin rod 2. Thus, the deceleration design is easy. Further, the upper-stage plunger 6 and the intermediate plunger 4 do not start descending at the same time, and hence the range of the increase in deceleration rate is kept small to allow the stable deceleration performance to be obtained.

Moreover, the height of the pin rod 2 is set smaller than the height of the orifice 6*e* when the plunger immediately above the base cylinder 1, that is, the intermediate plunger 4 in this case, starts to be compressed, and in addition, the tapered portion 2*a* is provided to the pin rod 2. Therefore, the stable deceleration performance can be obtained.

Further, by providing the columnar portion to the distal end of the pin rod 2, the stable deceleration performance can be obtained even when it is difficult to point the distal end.

Further, the oil chamber case 12 is provided to the upper-stage plunger 6, and hence a thickness of the entire oil buffer can be prevented from becoming large due to the oil chamber 13.

Moreover, the oil chamber case 12 is provided to the outer circumferential portion of the upper-stage plunger 6 to surround the upper-stage plunger 6, and hence a force at the time of collision of the ascending/descending body against the oil buffer is not applied to the oil chamber case 12. Therefore, the weight of the oil chamber case 12 can be reduced.

Further, the return spring 15 is provided between the base cylinder 1 and the upper-stage plunger 6, and hence a stable return operation is possible. Moreover, the weight of the return spring 15 is not exerted on a movable portion, and hence it is also possible to reduce the weight of the intermediate plunger 4 and that of the upper-stage plunger 6.

Second Embodiment

Figure 13:
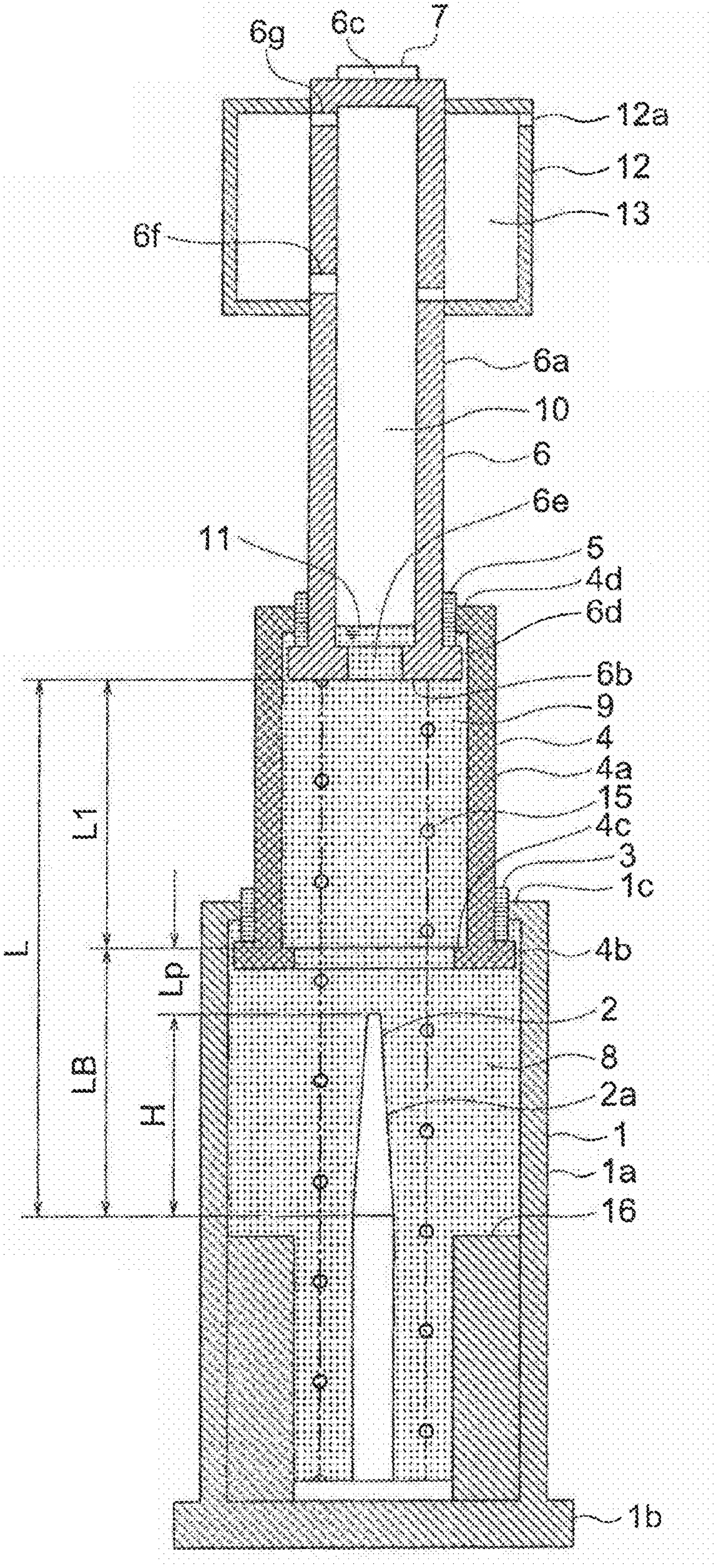
FIG. 13 is a sectional view illustrating the unloaded state of the oil buffer for the elevator according to a second embodiment of the present invention.
Figure 14:
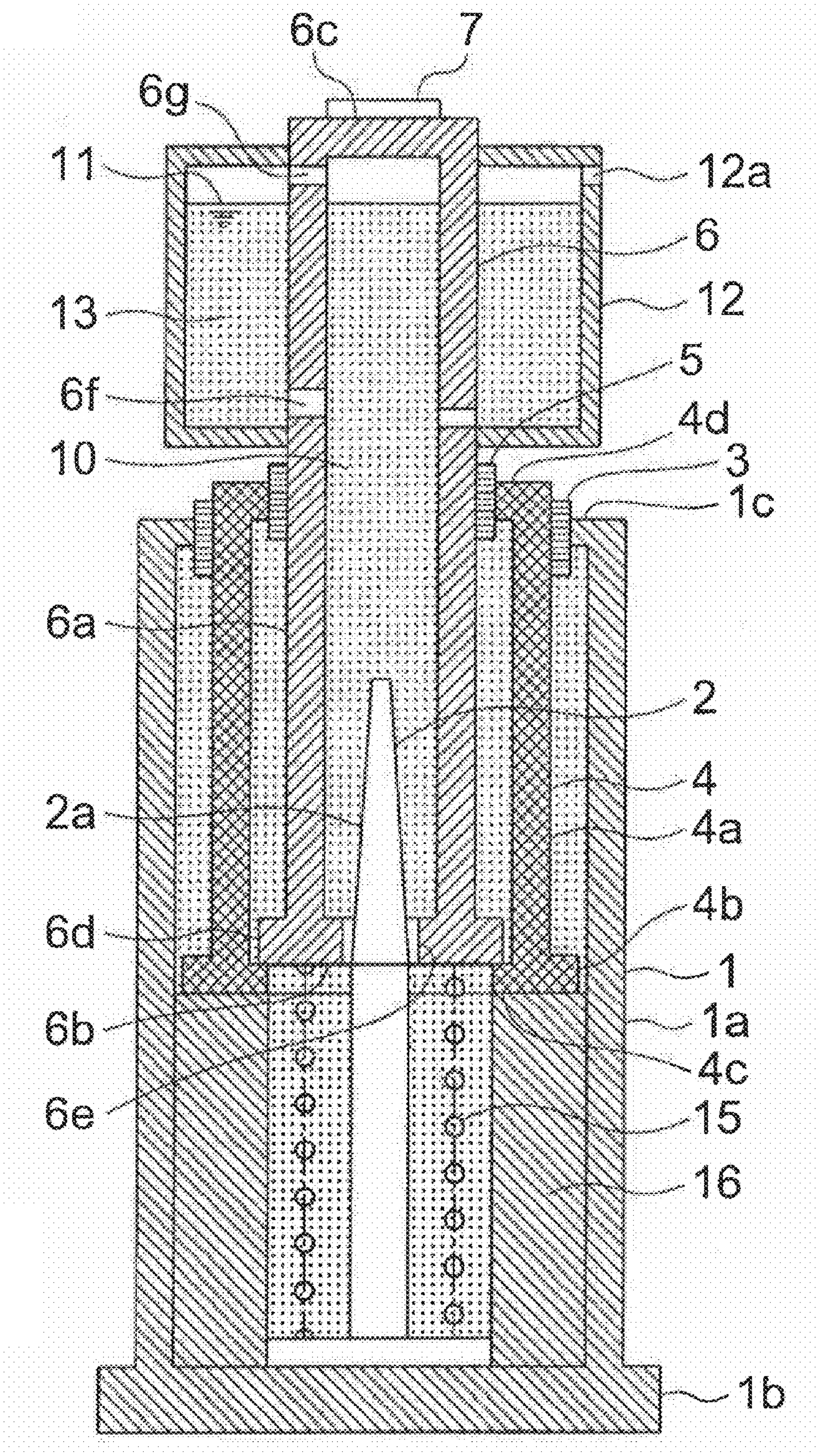
FIG. 14 is a sectional view illustrating a state where the oil buffer illustrated in FIG. 13 is compressed through the full stroke.

Next, FIG. 13 is a sectional view illustrating the unloaded state of the oil buffer for the elevator according to a second embodiment of the present invention, and FIG. 14 is a sectional view illustrating a state where the oil buffer illustrated in FIG. 13 is compressed through the full stroke. In the drawings, the return spring 15 is located inside the base cylinder 1 and the intermediate plunger 4. A lower end portion of the return spring 15 is fixed onto the base cylinder bottom surface portion 1*b*, whereas an upper end portion of the return spring 15 is caused to abut against a lower surface of the upper-stage plunger bottom surface portion 6*b*.

An intermediate plunger stopper 16 having a predetermined height, which receives the lower surface of the intermediate plunger 4 at the time of the full-stroke compression, is provided in the base cylinder 1. The heights of the base cylinder 1 and the pin rod 2 are increased by the heights of the intermediate plunger stopper 16. The remaining structure is the same as that of the first embodiment.

In the oil buffer as described above, the return spring 15 is accommodated in the base cylinder 1 and the intermediate plunger 4. Therefore, safety at the time of installation and at the time of maintenance can be improved.

Third Embodiment

Figure 15:
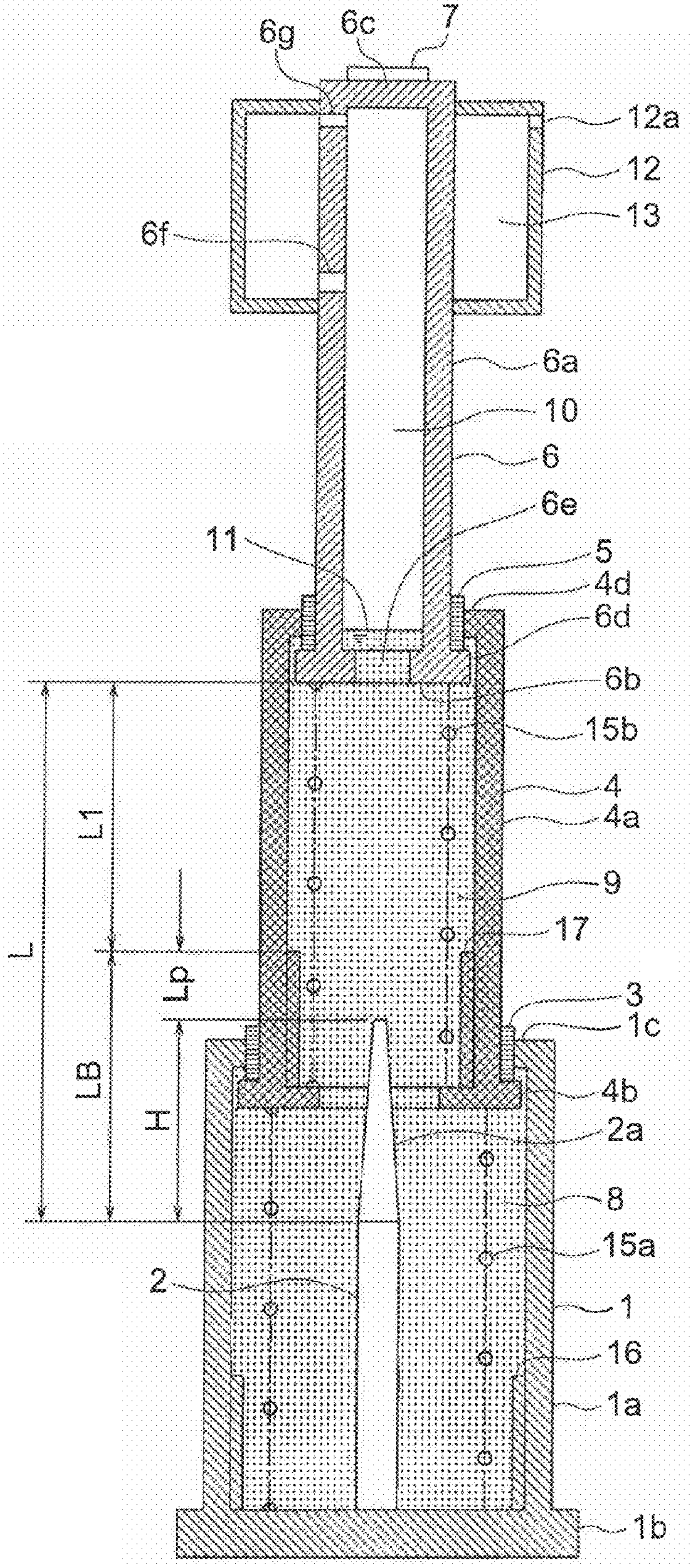
FIG. 15 is a sectional view illustrating the unloaded state of the oil buffer for the elevator according to a third embodiment of the present invention.
Figure 16:
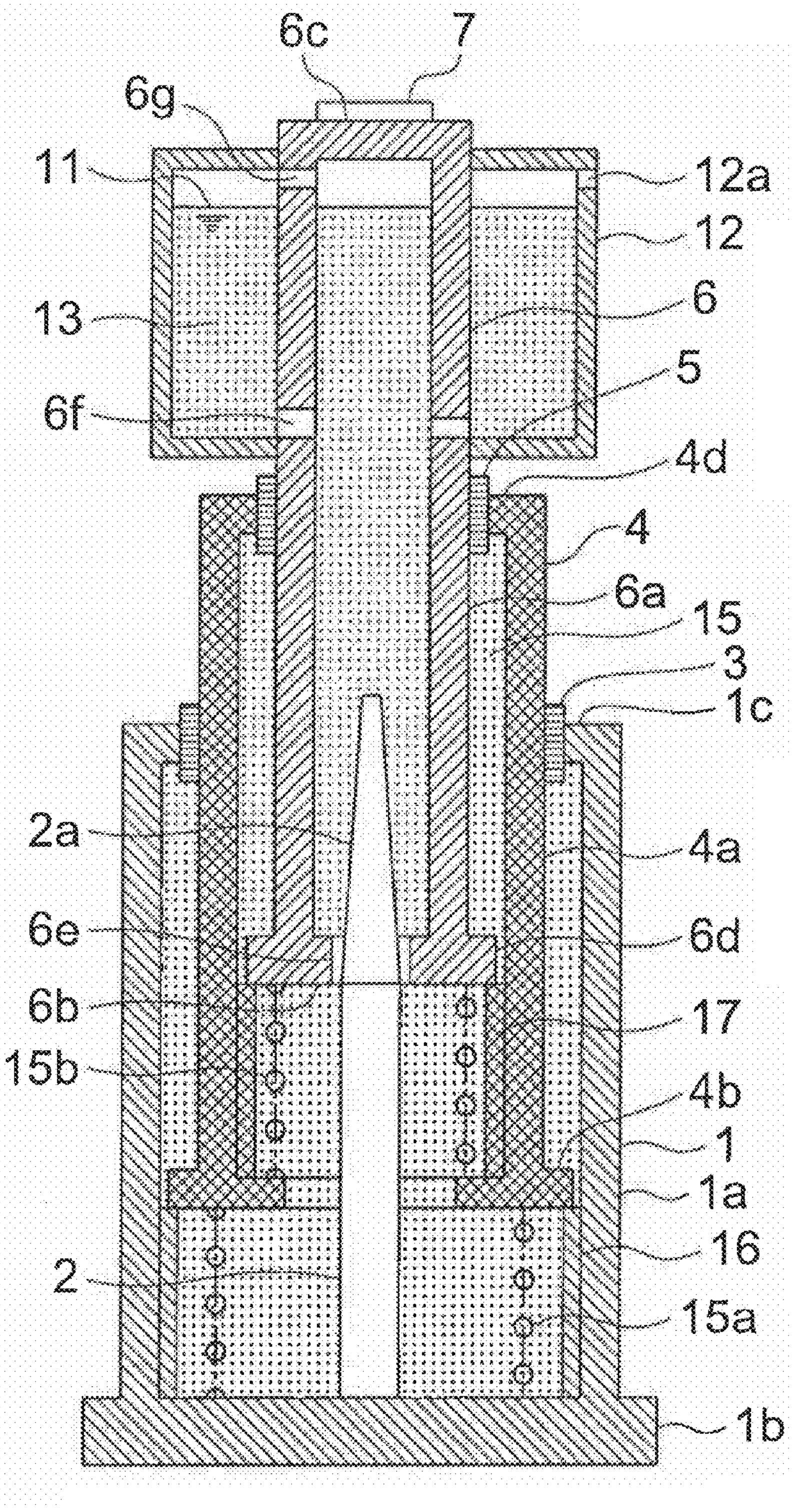
FIG. 16 is a sectional view illustrating a state where the oil buffer illustrated in FIG. 15 is compressed through the full stroke.

Next, FIG. 15 is a sectional view illustrating the unloaded state of the oil buffer for the elevator according to a third embodiment of the present invention, and FIG. 16 is a sectional view illustrating a state where the oil buffer illustrated in FIG. 15 is compressed through the full stroke. In the drawings, the intermediate plunger return spring 15*a* is accommodated inside the base cylinder 1. A lower end portion of the intermediate plunger return spring 15*a* is fixed onto the base cylinder bottom surface portion 1*b*, whereas an upper end portion of the intermediate plunger return spring 15*a* is caused to abut against a lower surface of the intermediate plunger 4.

An upper-stage plunger return spring 15*b* is accommodated in the intermediate plunger 4. A lower end portion of the upper-stage plunger return spring 15*b* is fixed onto the bottom surface portion of the intermediate plunger 4, whereas an upper end portion of the upper-stage plunger return spring 15*b* is caused to abut against the lower surface of the upper-stage plunger bottom surface portion 6*b*.

An intermediate plunger stopper 16 having a predetermined height, which receives the lower surface of the intermediate plunger 4 at the time of the full-stroke compression, is provided in the base cylinder 1. An upper-stage plunger stopper 17 for receiving the lower surface of the upper-stage plunger bottom surface portion 6*b* at the time of the full-stroke compression is provided in the intermediate plunger 4. The heights of the base cylinder 1, the intermediate plunger 4, and the pin rod 2 are increased by the heights of the stoppers 16 and 17. The remaining structure is the same as that of the first embodiment.

In the oil buffer as described above, the return springs 15*a* and 15*b* are accommodated in the base cylinder 1 and the intermediate plunger 4. Therefore, safety at the time of installation and at the time of maintenance can be improved. Moreover, the plunger return springs 15*a* and 15*b* respectively corresponding to the intermediate plunger 4 and the upper-stage plunger 6 are used, and hence a short length is sufficient for each of the springs. As a result, fabrication cost can be reduced.

Fourth Embodiment

Figure 17:
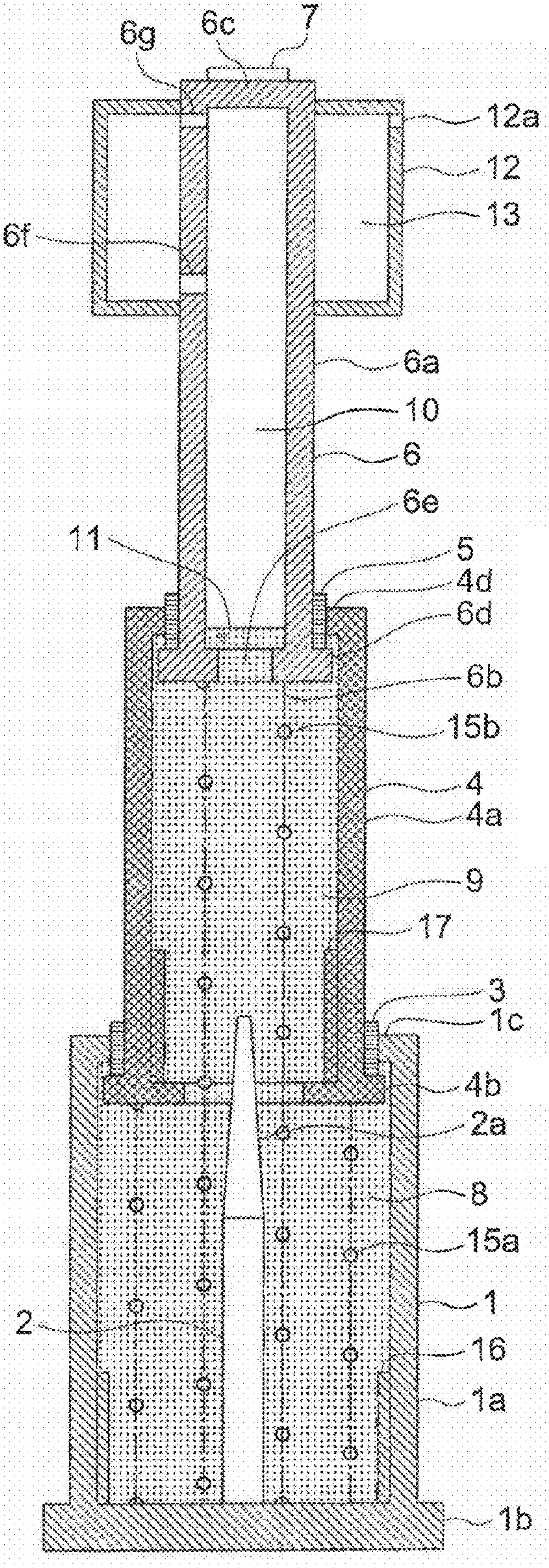
FIG. 17 is a sectional view illustrating the unloaded state of the oil buffer for the elevator according to a fourth embodiment of the present invention.

Next, FIG. 17 is a sectional view illustrating the unloaded state of the oil buffer for the elevator according to a fourth embodiment of the present invention. In this example, the intermediate plunger return spring 15*a* and the upper-stage plunger return spring 15*b* are arranged in parallel in a layered fashion. Moreover, the lower end portion of each of the return springs 15*a* and 15*b* is fixed onto the base cylinder bottom surface portion 1*b*. The remaining structure is the same as that of the third embodiment.

In the oil buffer as described above, the return springs 15*a* and 15*b* are accommodated in the base cylinder 1 and the intermediate plunger 4. Therefore, the safety at the time of installation and at the time of maintenance can be improved. Moreover, a reaction force and the weight of the upper-stage plunger return spring 15*b* are not exerted on the intermediate plunger 4, and hence an imposed load on the intermediate plunger return spring 15*a* is advantageously small.

The stopper portion may be caused to project from the outer circumferential surface of the upper-stage plunger 6 to the radially-outer side.

Moreover, although only one intermediate plunger 4 is used in the above-mentioned example, a plurality of the intermediate plungers may be used. In this case, the diameters of the intermediate plungers are determined to sequentially decrease from the base cylinder 1 side to the upper-stage plunger 6 side.

Further, although the oil buffer is provided on the bottom of the hoistway in the above-mentioned example, the oil buffer may be mounted to a lower part of the ascending/descending body. Moreover, in order to alleviate the impact of the collision against a ceiling portion of the hoistway or the collision between the ascending/descending bodies, it is also possible to provide the oil buffer to an upper part of the ascending/descending body or to the ceiling portion of the hoistway.

The invention claimed is:

1. An oil buffer for an elevator, comprising:

a base cylinder filled with a hydraulic oil;

an upper-stage plunger which is axially slidably inserted into the base cylinder for movement toward the base cylinder over a stroke of axially slidable movement of the upper stage plunger from an elevated position corresponding to an unloaded state to a compressed position corresponding to a loaded state, wherein the upper-stage plunger has an orifice provided in a bottom surface portion thereof;

at least one cylindrical intermediate plunger axially slidably inserted into the base cylinder, and including a bottom surface portion opened so as not to provide a superposition effect of the fluid resistance of the orifice and the bottom surface portion;

a pin rod, which is provided upright in the base cylinder, and is inserted into the orifice during a portion of the stroke of the upper-stage plunger from the elevated position to the compressed position; and a return spring mounted for causing the intermediate plunger and the upper-stage plunger to return from a position corresponding to the loaded state to the elevated position corresponding to the unloaded state, wherein the pin rod has a length such that a distal end of the pin rod is situated below the orifice when the intermediate plunger adjacent to the base cylinder starts descending from the elevated position thereof.

2. An oil buffer for an elevator according to claim 1, wherein the pin rod has a tapered portion having a gradually increasing cross section toward the bottom surface portion of the base cylinder.

3. An oil buffer for an elevator according to claim 2, wherein a columnar portion is provided to the distal end of the pin rod.

4. An oil buffer for an elevator according to claim 1, wherein an oil chamber case for forming an oil chamber, into which the hydraulic oil flows when the upper-stage plunger is compressed through a full stroke, is provided to the upper-stage plunger.

5. An oil buffer for an elevator according to claim 4, wherein the oil chamber case is provided to an outer circumferential portion of the upper-stage plunger to surround the upper-stage plunger.

6. An oil buffer for an elevator according to claim 1, wherein the return spring is provided between the base cylinder and the upper-stage plunger.

* * * * *